Patented May 1, 1934

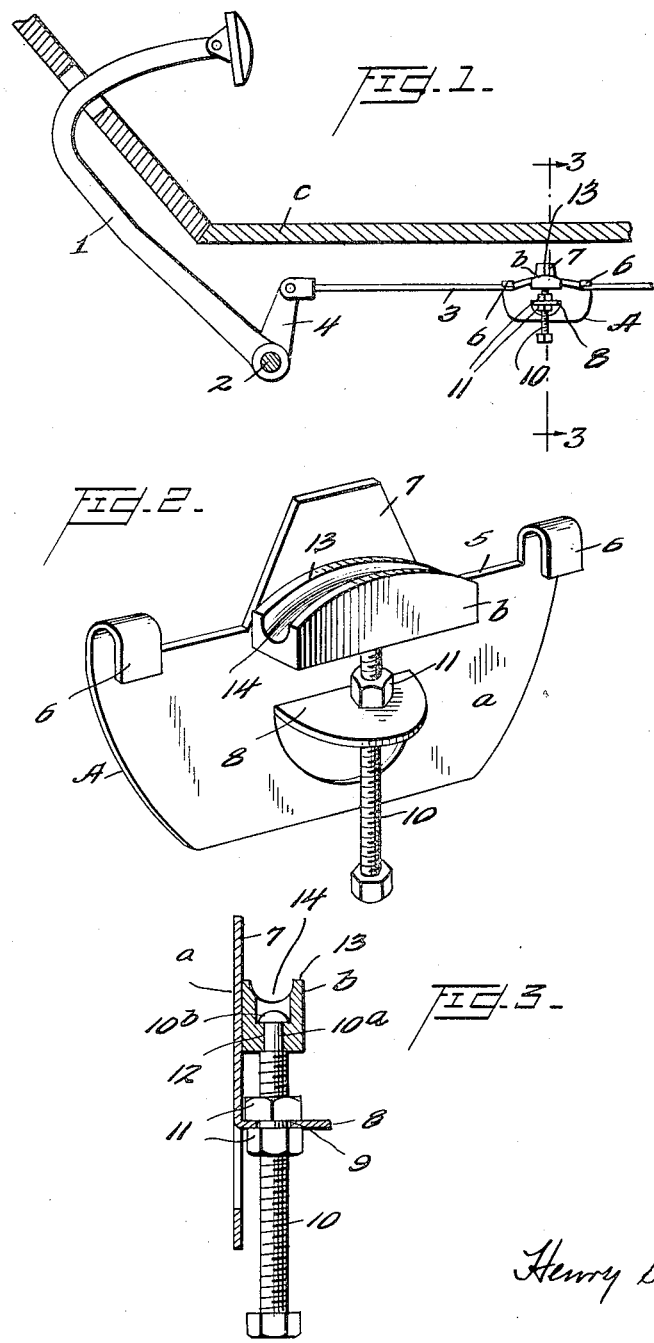

1,957,367

UNITED STATES PATENT OFFICE 1,957,367

TAKE-UP FOR BRAKE CABLES

Henry Suydam, Huntington, N. Y.

Application July 28, 1932, Serial No. 625,496

1 Claim. (Cl. 188—196)

The purpose of this invention is to provide a slack adjuster for automobile brake cables which is of simple and inexpensive construction and can be applied to the cable by anyone without disconnecting the cable from the brake operating devices. The slack adjuster comprises a sheet metal plate having tongues at its ends, bent into U-form and constituting hooks which may be passed over the cable, and having a lug struck up from the central part of the plate and projecting at right angles thereto, forming a support for an adjusting screw or bolt. This lug has a perforation through which the bolt extends and nuts applied to the screw at opposite ends of the lug hold the screw in any desired position of adjustment. Upon the screw is mounted a shoe adapted to engage the cable midway between the hooks. The shoe is preferably formed with a convex face having a longitudinal groove for engaging the cable. By forcing the shoe against the cable, the latter is bent between the lugs, thus taking up the slack. The shoe is swiveled to the adjusting screw, but rests with one side close to the plate which prevents the shoe from turning about the axis of the screw and always holds the shoe with its curved face in alinement with the hooks.

The adjuster is not connected to any fixed part of the automobile, but floats with the cable. It constitutes a desirable accessory which may be applied to a brake cable at any time and as slack occurs in the cable, it may be taken up by tightening the adjusting screw.

In the accompanying drawing,

Fig. 1 shows in side elevation a foot-brake lever of an automobile and a cable for operating the brake shoes, with the slack adjuster applied to the cable, the floor boards being shown in section;

Fig. 2 is a perspective view of the slack adjuster, and,

Fig. 3 is a section through the adjuster on the line 3—3 of Fig. 1.

Referring to Fig. 1 of the drawing, 1 indicates a brake lever mounted upon a rock-shaft 2 beneath the floor boards C of an automobile and 4 indicates an arm secured to the shaft and to which is attached a cable 3 which leads to the devices for applying and releasing the brake shoes. The slack adjuster A of my invention is shown attached to the cable in Fig. 1.

Referring to Fig. 2, the slack adjuster comprises a flat oblong metal plate $a$ having projecting from its edge 5, at opposite ends of the plate, a pair of similar tongues 6 which are bent backwardly over the plate forming alined hooks at the opposite ends of the plate adapted to engage the cable 3. Midway between these hooks, the body of the plate has a part 7 extending beyond the edge 5 and, also, in the central part of the plate, opposite the extension 7, a lug 8, struck up from the body of the plate, projects at right angles to it on the same side of the plate as the hooks 6. This lug has a central opening 9 adapted to receive bolt 10 which may be held in any desired position of adjustment by means of nuts 11 threaded onto the bolt, at opposite sides of the lug and adapted to be tightened against the lug. The bolt has a part $10^a$, at its end, which is not threaded and this extends through a central opening 12 in a shoe $b$ and has a head $10^b$ for retaining the shoe upon the bolt. The bolt fits freely in the opening so that a swivel connection is formed between the bolt and shoe.

The shoe $b$, as shown, is an oblong metal block having flat sides, one of which is close to the body of the plate $a$. The side 13 of the shoe is convex, as shown, and has a longitudinal groove 14 adapted to engage the cable when the latter is within the hooks 6, as shown in Fig. 1. The shoe can be adjusted toward or from the lug 8 by loosening the nuts 11 and by tightening these nuts, the shoe may be held in any position of adjustment. As the shoe lies close to the plate, the latter keeps it from turning and the groove in the shoe is always in the plane of the hooks. The extension 7 of the plate guides the shoe and prevents it from turning when the shoe is adjusted beyond the edge 5 of the plate.

When the device is to be applied to a brake cable, the shoe is adjusted close to the lug 8 and the hooks then are extended over the cable and it will lie in the groove of the shoe. By then adjusting the shoe away from the lug 8, the cable will be bent by the shoe between the hooks and the slack in the cable will be taken up. The device will then float with the cable when the break lever is operated, since the device is not connected to any stationary part.

What I claim is:

A slack adjuster for vehicle brake cables comprising a sheet metal plate having tongues at its opposite ends bent into U-form and constituting hooks adapted to hook over a cable, said plate having a part extending upwardly from its central portion above the hooks and having a lug struck up from its central portion below the hooks and projecting at a right angle to the body of the plate, said lug having an opening therethrough, a threaded bolt extending through said opening, a shoe swiveled to said bolt and having one side engaging the plate, said shoe adapted to bear on the cable midway between the hooks, and locking means on the bolt engaging the lug.

HENRY SUYDAM.